(12) United States Patent
Chui et al.

(10) Patent No.: US 10,763,978 B2
(45) Date of Patent: Sep. 1, 2020

(54) WIRELESS POSITIONING CALIBRATION SYSTEM AND WIRELESS POSITIONING CALIBRATION METHOD

(71) Applicant: Industrial Technology Research Institute, Hsinchu (TW)

(72) Inventors: Pi-Chen Chui, Hsinchu (TW); Ting-Wu Ho, Hsinchu (TW); Chia-Lung Liu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 125 days.

(21) Appl. No.: 16/230,842

(22) Filed: Dec. 21, 2018

(65) Prior Publication Data

US 2020/0083965 A1     Mar. 12, 2020

(30) Foreign Application Priority Data

Sep. 7, 2018   (TW) .............................. 107131639 A

(51) Int. Cl.
| | |
|---|---|
| *H04B 17/12* | (2015.01) |
| *H04B 7/06* | (2006.01) |
| *H04B 17/318* | (2015.01) |
| *H04W 64/00* | (2009.01) |
| *H04B 7/08* | (2006.01) |
| *H04W 24/10* | (2009.01) |

(52) U.S. Cl.
CPC ........... *H04B 17/12* (2015.01); *H04B 7/0626* (2013.01); *H04B 7/086* (2013.01); *H04B 17/318* (2015.01); *H04W 64/003* (2013.01); *H04W 24/10* (2013.01)

(58) Field of Classification Search
None
See application file for complete search history.

(56) References Cited

U.S. PATENT DOCUMENTS

| 6,489,923 B1 | 12/2002 | Bevan et al. |
| 7,499,581 B2 | 3/2009 | Tribble et al. |

(Continued)

FOREIGN PATENT DOCUMENTS

| CN | 102165288 A | 8/2011 |
| CN | 103134568 A | 6/2013 |

(Continued)

OTHER PUBLICATIONS

Determining RF Angle of Arrival Using COTS Antenna Arrays: A Field Evluatoin; Hsieh-Chung Chen, Tsung-Han Lin, H.T. Kung, Chit-Kwan Lin, Youngjune Gwon; IEEE Military Communications Conference; 2013; 1-6.

(Continued)

*Primary Examiner* — Christine T Duong
(74) *Attorney, Agent, or Firm* — Mintz Levin Cohn Ferris Glovsky and Popeo, P.C.; Peter F. Corless; Steven M. Jensen

(57) ABSTRACT

Provided is a wireless positioning calibration system, including a plurality of transmission base stations, at least one sniffer base station and a positioning server. The at least one sniffer base station receives a plurality of channel state information (CSI) transmitted by the plurality of transmission base stations. The positioning server receives the plurality of CSI transmitted by the at least one sniffer base station. The positioning server calculates a phase error and an antenna spacing error generated by the at least one sniffer base station by means of the plurality of CSI, and compensates the phase error and the antenna spacing error. A wireless positioning calibration method is also provided.

38 Claims, 18 Drawing Sheets

(56) References Cited

U.S. PATENT DOCUMENTS

| | | |
|---|---|---|
| 8,184,848 B2 | 5/2012 | Wu et al. |
| 9,846,070 B2 | 12/2017 | Omegna De Souza Filho |
| 9,883,348 B1 | 1/2018 | Walker et al. |
| 2006/0178578 A1 | 8/2006 | Tribble et al. |
| 2014/0327579 A1 | 11/2014 | Hart et al. |
| 2015/0002658 A1 | 1/2015 | Jaw et al. |
| 2016/0073372 A1 | 3/2016 | Sen et al. |
| 2016/0187460 A1 | 6/2016 | Zeng et al. |
| 2016/0334498 A1 | 11/2016 | Jamieson et al. |
| 2016/0345286 A1 | 11/2016 | Jamieson et al. |
| 2017/0303090 A1* | 10/2017 | Stitt ............... H04W 76/15 |
| 2018/0091952 A1 | 3/2018 | Sant et al. |

FOREIGN PATENT DOCUMENTS

| | | |
|---|---|---|
| TW | I590190 B | 7/2017 |
| TW | I608221 B | 12/2017 |
| WO | 2015/047937 A2 | 4/2015 |

OTHER PUBLICATIONS

Passive Detection of Moving Targets with Dynamic Speed using PHY Layer Information; Kun Qian, Chenshu Wu, Zeng Yang, Yunhao Liu, Zimu Zhou; IEEE Conference on Parallel and Distributed System (ICPADS); 2014; 1-8.

Direction Finding of Rouge Wi-Fi Access Points using an off-the-shelf MIMO-OFDM Receiver; Asaf Tzur, Ofer Amrani, Avishai Wool; Physical Communication Journal; 2015; 149-164.

PhaseU:Real-time LOS Identification with Wi-Fi; Chenshu Wu, Zheng Yang, Zimu Zhou, Kun Qian, Yunhao Liu, Mingyan Liu; IEEE Conference on Computer Communication(INFOCOM); 2015; 2038-2046.

CSI Phase Fingerprinting for Indoor Localization with a Deep Learning Approach; Xuyu Wang, Lingjun Gao, Shiwen Mao, IEEE Internet of Things Journal; 2016; 1113-1123.

Angle of Arrival Estimation Using Wi-Fi and Smartphpones; Martin Schussel; International Conference on Indoor Positioning and Indoor Navigation(IPIN); 2016; 1-4.

* cited by examiner

WIRELESS POSITIONING CALIBRATION SYSTEM AND WIRELESS POSITIONING CALIBRATION METHOD

CROSS-REFERENCE TO RELATED APPLICATIONS

This application claims priority to Taiwanese Application Serial No. 107131639, filed on Sep. 7, 2018. The entirety of the above-mentioned patent application is hereby incorporated by reference herein and made a part of this specification.

BACKGROUND

1. Technical Field

The present disclosure generally relates to wireless positioning systems and, more specifically, to a wireless positioning calibration system and a wireless positioning calibration method that use channel state information (CSI).

2. Description of Related Art

With the continuous advances in the communication technology, accurate indoor positioning services are required in a myriad of applications to satisfy the needs of users. Indoor positioning applications create a lot of business opportunities in the enterprise context, including visitor management, personnel management, area control, emergency call etc., and are thus of imminent importance. In addition, Next Generation Mobile Networks (NGMM) has also included the requirements for accurate indoor positioning into its 5G White Paper.

In order to improve the accuracy of indoor positioning, channel state information (CSI) positioning is one of the most popular research areas. CSI positioning involves calculating an angle of arrival (AoA) of a receiving signal based on phase differences between uplink signals received by a plurality of antennas of a base station. This improves the accuracy in positioning.

However, channel state information are processed by the antenna hardware circuits, and the hardware circuit of each antenna may create additional phase variations, which leads to errors in the positioning of a mobile device relative to the base station, lowering the accuracy of positioning using CSI.

Furthermore, channel state information requires measuring the spacing between the antennas of the base station, such that the AoA can be computed based on the phase differences between the signals received by the antennas of the base station. In other words, if the spacing between the antennas in the base station are altered, the error rate increases, and re-measuring of the spacing between the antennas becomes necessary.

In view of the forgoing shortcomings, there is a need in the art to effectively improve the accuracy in channel state information positioning. With this in mind, how to provide an improved indoor positioning method based on existing base stations to maximize the accuracy of positioning remains a problem to be solved.

SUMMARY OF THE DISCLOSURE

According to an embodiment of the present disclosure, a wireless positioning calibration system may include: at least one sniffer base station for receiving a plurality of channel state information (CSI) transmitted by a plurality of transmission base stations; and a positioning server for receiving the plurality of CSI transmitted by the at least one sniffer base station, calculating a phase error and an antenna spacing error created by the at least one sniffer base station by means of the plurality of CSI, and compensating the phase error and the antenna spacing error.

According to another embodiment of the present disclosure, a wireless positioning calibration system may include: at least one sniffer base station for receiving a plurality of channel state information (CSI) transmitted by a plurality of base stations; and a positioning server for receiving the plurality of CSI transmitted by the at least one sniffer base station, calculating an angle of arrival (AoA) error and a time of flight (ToF) error created by the at least one sniffer base station by means of the plurality of CSI, and compensating the AoA error and the ToF error.

According to yet another embodiment of the present disclosure, a wireless positioning calibration method may include: at least one sniffer base station receiving a plurality of CSI transmitted by a plurality of transmission base stations; a positioning server receiving the plurality of CSI transmitted by the at least one sniffer base station; and the positioning server calculating a phase error and an antenna spacing error created by the at least one sniffer base station by means of the plurality of CSI, and compensating the phase error and the antenna spacing error.

According to still another embodiment of the present disclosure, a wireless positioning calibration method may include: at least one sniffer base station receiving a plurality of CSI transmitted by a plurality of transmission base stations; a positioning server receiving the plurality of CSI transmitted by the at least one sniffer base station; and the positioning server calculating an angle of arrival (AoA) and a time of flight (ToF) error created by the at least one sniffer base station by means of the plurality of CSI, and compensating the AoA error and the ToF error.

DETAILED DESCRIPTION

Figure 1:
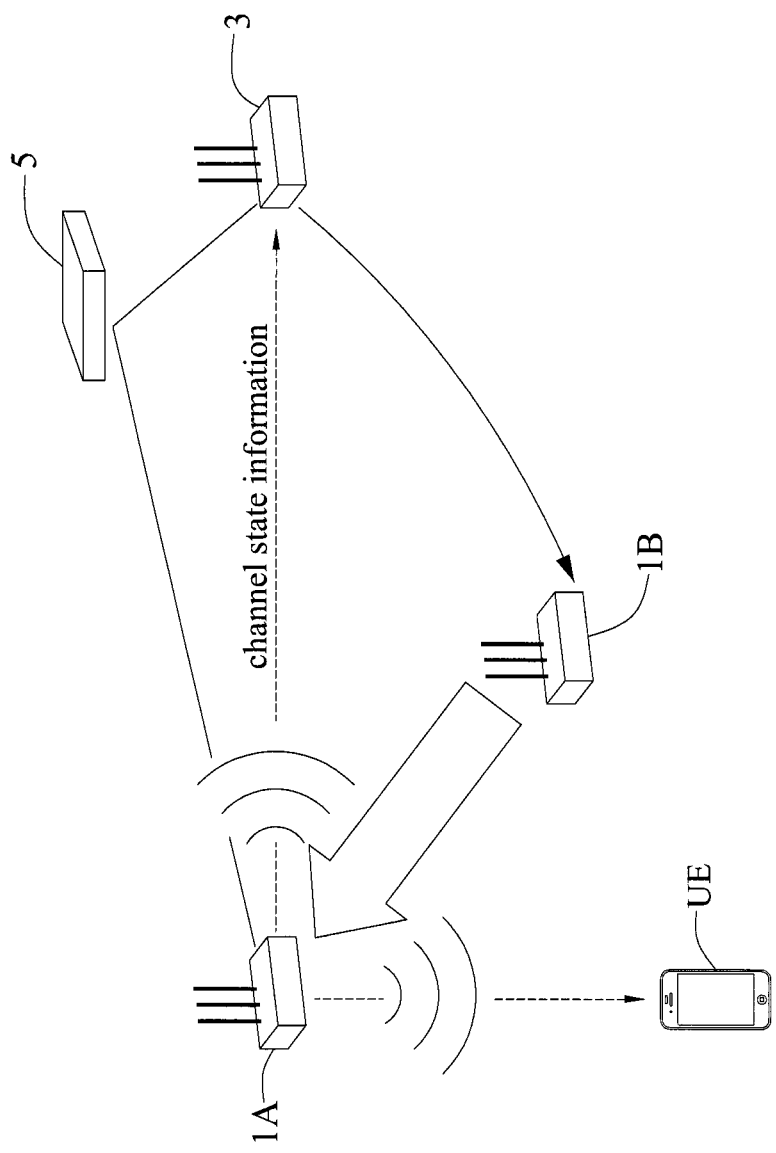
FIG. 1 is a schematic view of a wireless positioning calibration system in accordance with the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A wireless positioning calibration system and a wireless positioning calibration method are disclosed. With channel state information (CSI) and a sniffer capability of the base station, the positioning errors caused by antenna hardware circuits and antenna spacing errors can be compensated to effectively improve the accuracy in positioning.

FIG. 1 is a wireless positioning calibration system in accordance with the present disclosure. The wireless positioning calibration system includes a plurality of transmission base stations 1, at least one sniffer base station 3 and a positioning server 5. In an embodiment, the at least one sniffer base station 3 is a base station operating under a sniffer mode, wherein the transmission base station 1A is its real location, and the transmission base station 1B is the location of the transmission base station 1A calculated by the positioning server 5 based on channel state information of the transmission base station 1A provided by the sniffer base station 3.

In order to increase the precision of indoor positioning of base station, errors generated due to the errors of inherent antenna hardware circuits and antenna intervals (hereinafter referred to as inherent errors) have to be calibrated or compensated. Existing base stations supporting long-term evaluation (LTE) can operate in a transmission mode or a sniffer mode. According to the present disclosure, when the base station operates in the sniffer mode (e.g., the base station is the sniffer base station 3), the sniffer base station 3 will receive channel state information of a base station operating in the transmission mode (e.g., the transmission base station 1A), and transmits the channel state information to the positioning server 3. The real locations of all transmission base stations 1A in the field will be stored in the positioning server 3 in advanced. The positioning server 3 speculates the location (a speculated location) of the transmission base station 1A based on the channel information of the transmission base station 1A transmitted from the sniffer base station 3. The positioning server 5 gets to know the inherent errors of the sniffer base station 3 based on the error between the real location and the speculated location of the transmission base station 1A, and transmits and stores the inherent errors to the sniffer base station 3. When the sniffer base station 3 operates in the transmission mode (the sniffer base station is changed to be the transmission base station), the calibrated or compensated channel state information (i.e., the new channel state information added by the inherent errors) is used to position the user end UE.

For instance, when the transmission base station 1A transmits data to the user end (UE), the at least one sniffer base station 3 receives a plurality of CSI transmitted by the plurality of transmission base stations 1, and transmits the plurality of CSI to the positioning server 5. The positioning server 5 receives the plurality of CSI transmitted by the at least one sniffer base station 3. The positioning server 5 then calculates errors caused by the antenna hardware circuits and the antenna spacing errors of the at least one sniffer base station 3 by means of the plurality of CSI, and calibrates or compensates the errors. After the sniffer base station 3 is calibrated or compensated, when a new use end UE is connected to the sniffer base station 3, the sniffer base station 3 will use the calibrated or compensated channel state information to position the new user end UE.

Figure 2:
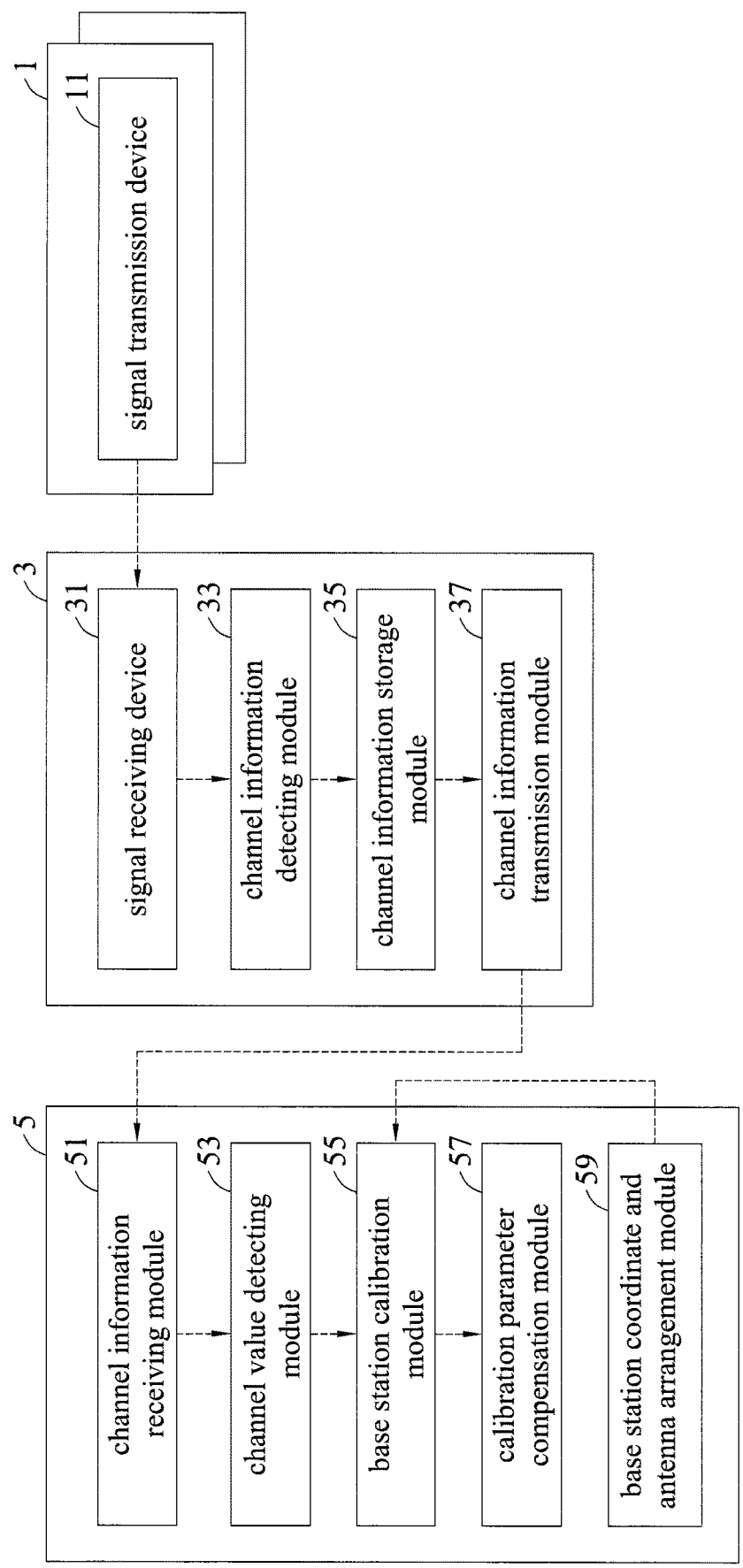
FIG. 2 is a block diagram of a wireless positioning calibration system in accordance with the present disclosure.

As shown in FIG. 2, a block diagram depicting a wireless positioning calibration system in accordance with the present disclosure is shown. The plurality of transmission base stations 1 transmit the plurality of CSI to the at least one sniffer base station 3. The at least one sniffer base station 3 receives and transmits the plurality of CSI transmitted by the plurality of transmission base stations 1 to the positioning server 5. The positioning server 5 then receives the plurality of CSI transmitted by the at least one sniffer base station 3. In an embodiment, the at least one routing layer 3 is a base station operating under the sniffer mode. The positioning server 5 then calculates the phase error and the antenna spacing error created by the at least one sniffer base station 3 by means of the CSI, and compensates the phase error and the antenna spacing error.

Each of the plurality of transmission base stations 1 includes a signal transmission device 11. Thus, the signal transmission device 11 of each of the transmission base stations 1 transmits the plurality of CSI to the at least one sniffer base station 3.

As shown in FIG. 2, the at least one sniffer base station 3 includes a signal receiving device 31, a channel information detecting module 33, a channel information storage module 35 and a channel information transmission module 37. The signal receiving device 31 receives the CSI transmitted by the signal transmission device 11 of each of the transmission base stations 1, and transmits the CSI to the positioning server 5. The CSI will also be detected by the channel information detecting module 33 and stored in the channel information storage module 35.

Figure 3:
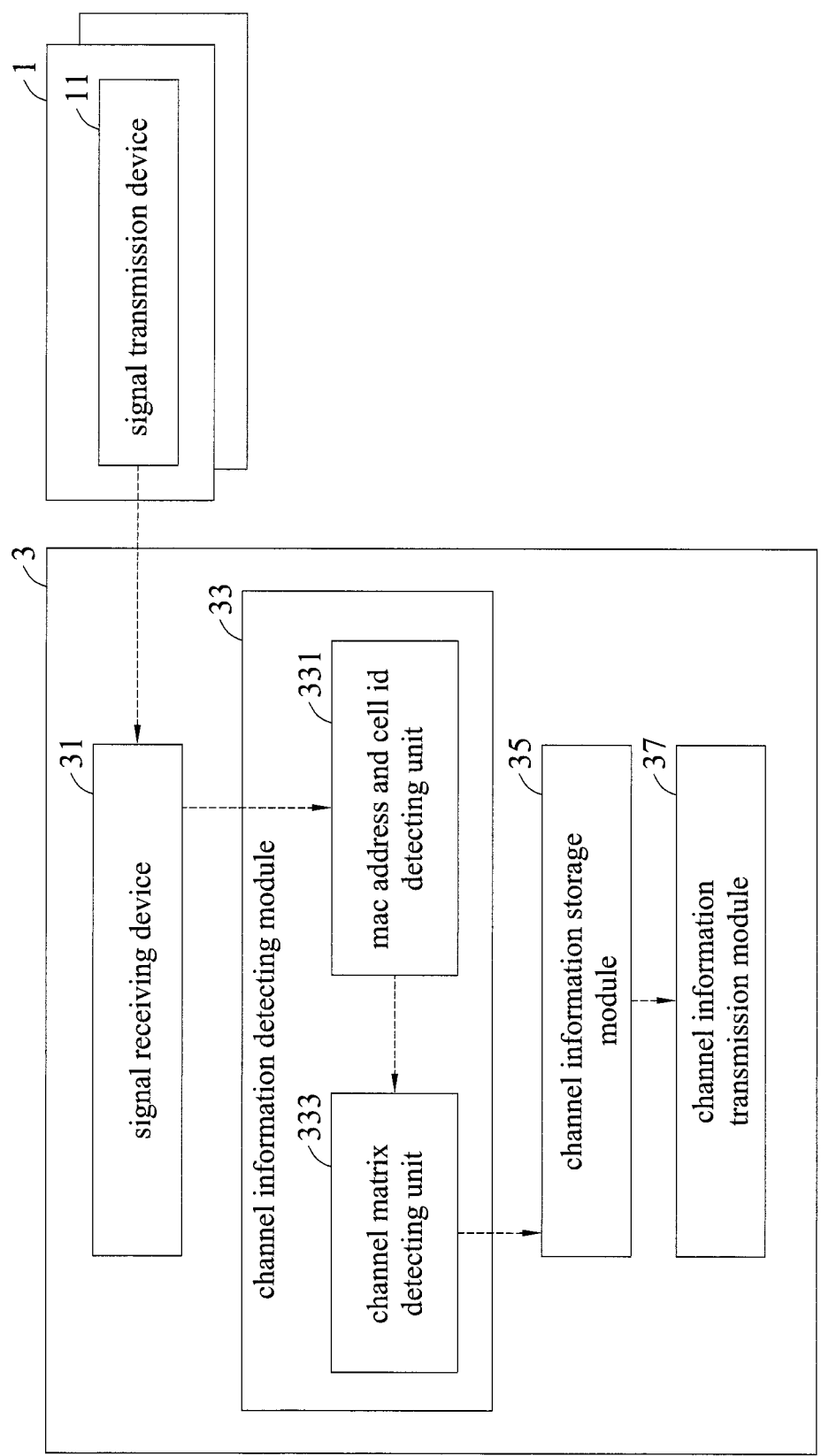
FIG. 3 is a block diagram depicting transmission base stations and a sniffer base station in a wireless positioning calibration system in accordance with the present disclosure.

FIG. 3 is a block diagram depicting a plurality of transmission base stations 1 and at least one sniffer base station 3 in accordance with the present disclosure. The channel information detecting module 33 of the at least one sniffer base station 3 includes a Media Access Control (MAC) address and cell ID detecting unit 331 and a channel matrix detecting unit 333.

Figure 4:
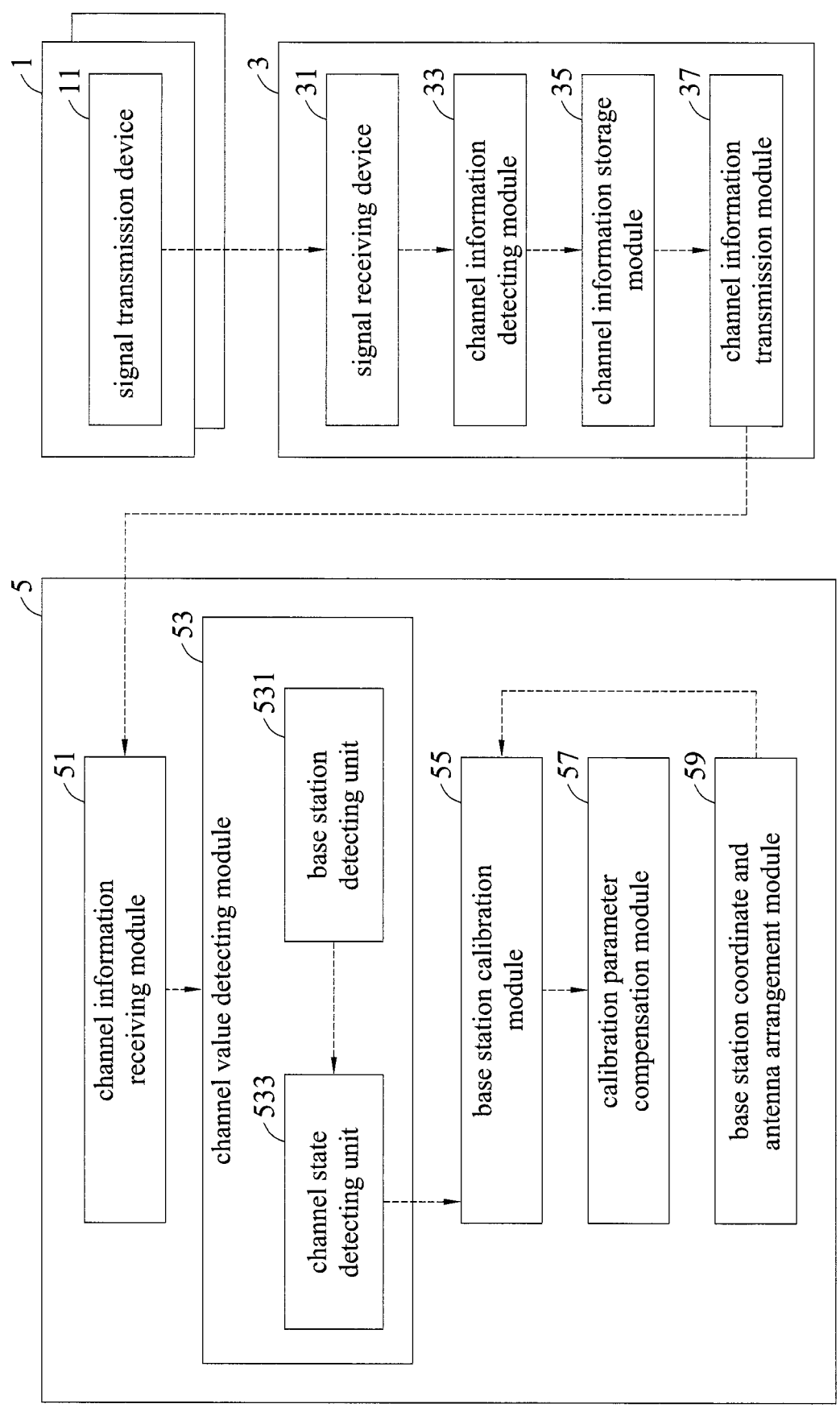
FIG. 4 is a block diagram depicting a positioning server (including a base station detecting unit and a channel state detecting unit of a channel value detecting module) of a wireless positioning calibration system in accordance with the present disclosure.

FIG. 4 is a block diagram depicting a plurality of transmission base stations 1, at least one sniffer base station 3 and a positioning server 5 (including its inner modules) in accordance with the present disclosure. The positioning server 5 includes a channel information receiving module 51, a channel value detecting module 53, a base station calibration module 55, a base station coordinate and antenna arrangement module 59 and a calibration parameter compensation module 57.

Figure 5:
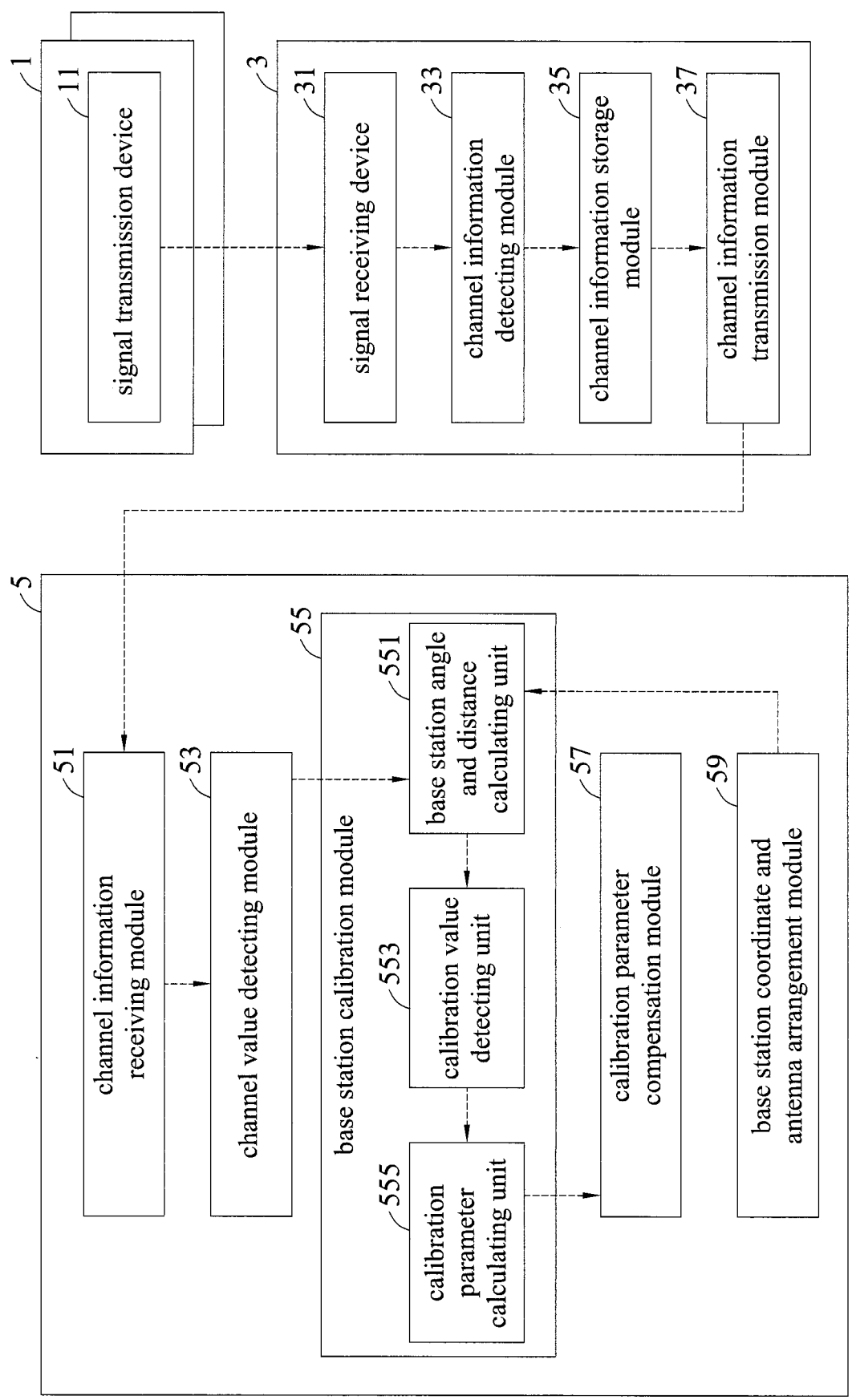
FIG. 5 is a block diagram depicting a positioning server (including a base station angle and distance calculating unit, a second screen cable connector, and a calibration value detecting unit of a base station calibration module) of a wireless positioning calibration system in accordance with the present disclosure.

As shown in FIG. 4, the channel information receiving module 51 of the positioning server 5 receives the CSI transmitted by the channel information transmission module 37 of the at least one sniffer base station 3. The channel value detecting module 53 of the positioning server 5 includes a base station detecting unit 531 and a channel state detecting unit 553. As shown in FIG. 5, the base station calibration module 55 of the positioning server 5 includes a base station angle and distance calculating unit 551, a calibration value detecting unit 553, and a calibration parameter calculating unit 555. In an embodiment, the base station calibration module 55 receives information transmitted from the channel value detecting module 53 and a transmission base station coordinate and antenna arrangement module 59, and calculates the angles and the distances of the base stations. The transmission base station coordinate and antenna arrangement module 59 has the coordinates of all the transmission base stations 1 in the field. As such, the base station angle and distance calculating unit 551 calculates the angle of arrival (AoA) of each of the plurality of CSI transmitted from each of the plurality of transmission base stations 1 to the at least one sniffer base station 3 and the distance between each of the plurality of transmission base stations 1 and the at least one sniffer base station 3.

In accordance with an embodiment of the present disclosure, the calibration value detecting unit 553 of the base station calibration module 55 of the positioning server 5 detects a phase error and an antenna spacing error according to mathematical expressions (1) and (2) below, respectively:

$$\phi_{i,k} = \tilde{\phi}_{i,k} - \omega_{i,k} 2\pi - \Delta_{i,k} \quad (1)$$

wherein i is the antenna number of the at least one sniffer base station, k is the subcarrier number of the at least one sniffer base station, $\phi_{i,k}$ is the actual phase of a $k^{th}$ subcarrier of an $i^{th}$ antenna of the at least one sniffer base station, $\tilde{\phi}_{i,k}$ is the measured phase of the $k^{th}$ subcarrier of the $i^{th}$ antenna of the at least one sniffer base station, and $\omega_{i,k}$ and $\Delta_{i,k}$ are phase errors created by the at least one sniffer base station; and $$l = \tilde{l} + \varepsilon \quad (2)$$

wherein l is the actual antenna spacing of the at least one sniffer base station, $\tilde{l}$ is the measured antenna spacing of the at least one sniffer base station, and $\varepsilon$ is the error of antenna spacing.

As shown in FIG. 5, in accordance with an embodiment of the present disclosure the calibration parameter calculating unit 555 of the base station calibration module 55 of the positioning server 5 performs algorithms according to the mathematical expressions (3) to (8) below:

$$\min \sum_{i \in \{1,2\}, k \in \{1,2,\ldots,30\}} \|h_{i,k} - h_{i,k}^{Est}\|^2 \quad (3)$$

$$\text{s.t. } h_{i,k} = \tilde{a}_{i,k} e^{-j(\tilde{\phi}_{i,k} - \omega_{i,k} 2\pi - \Delta_{i,k})} \quad (4)$$

$$h_{i,k}^{Est} = \sum_{n=1}^{N} \left(a_n e^{-j2\pi \frac{d_n}{\lambda_k}}\right) e^{-j2\pi \frac{(i-1)(\tilde{l}+\varepsilon)\sin\theta_n}{\lambda_k}} \quad (5)$$

$$M = \operatorname{argmax}_{n \in N} \{a_n\} \quad (6)$$

$$|\theta_M - \theta^R| \leq B^A, \, |d_M - d^R| \leq B^D \quad (7)$$

$$\omega_{i,k} \in \mathbb{Z}, \, 0 \leq \Delta_{i,k} \leq 2\pi, \quad (8)$$

wherein $\tilde{a}_{i,k}$ is the measured channel amplitude of the $k^{th}$ subcarrier of the $i^{th}$ antenna of the at least one sniffer base station, $\phi_{i,k}$ is the actual phase of the $k^{th}$ subcarrier of the $i^{th}$ antenna of the at least one sniffer base station, $\tilde{\phi}_{i,k}$ is the measured phase of the $k^{th}$ subcarrier of the $i^{th}$ antenna of the at least one sniffer base station, $\omega_{i,k}$ and $\Delta_{i,k}$ are phase errors created by the at least one sniffer base station, $\lambda_k$ is the signal wavelength, M is the primary path (when n=M), $\phi_M$ is the angle of the primary path, $d_M$ is the distance of the primary path, $\theta^R$ is the actual angle of arrival, $d^R$ is the actual distance, $\alpha_n$ is the amplitude of an $n^{th}$ path, $d_n$ is the distance of the $n^{th}$ path, $\theta_n$ is the angle of the $n^{th}$ path, l is the actual antenna spacing of the at least one sniffer base station, $\tilde{l}$ is the measured antenna spacing of the at least one sniffer base station, $\varepsilon$ is the error of antenna spacing, $B^A$ is the angle of the primary path, and $B^D$ is the distance of the primary path.

Figure 6:
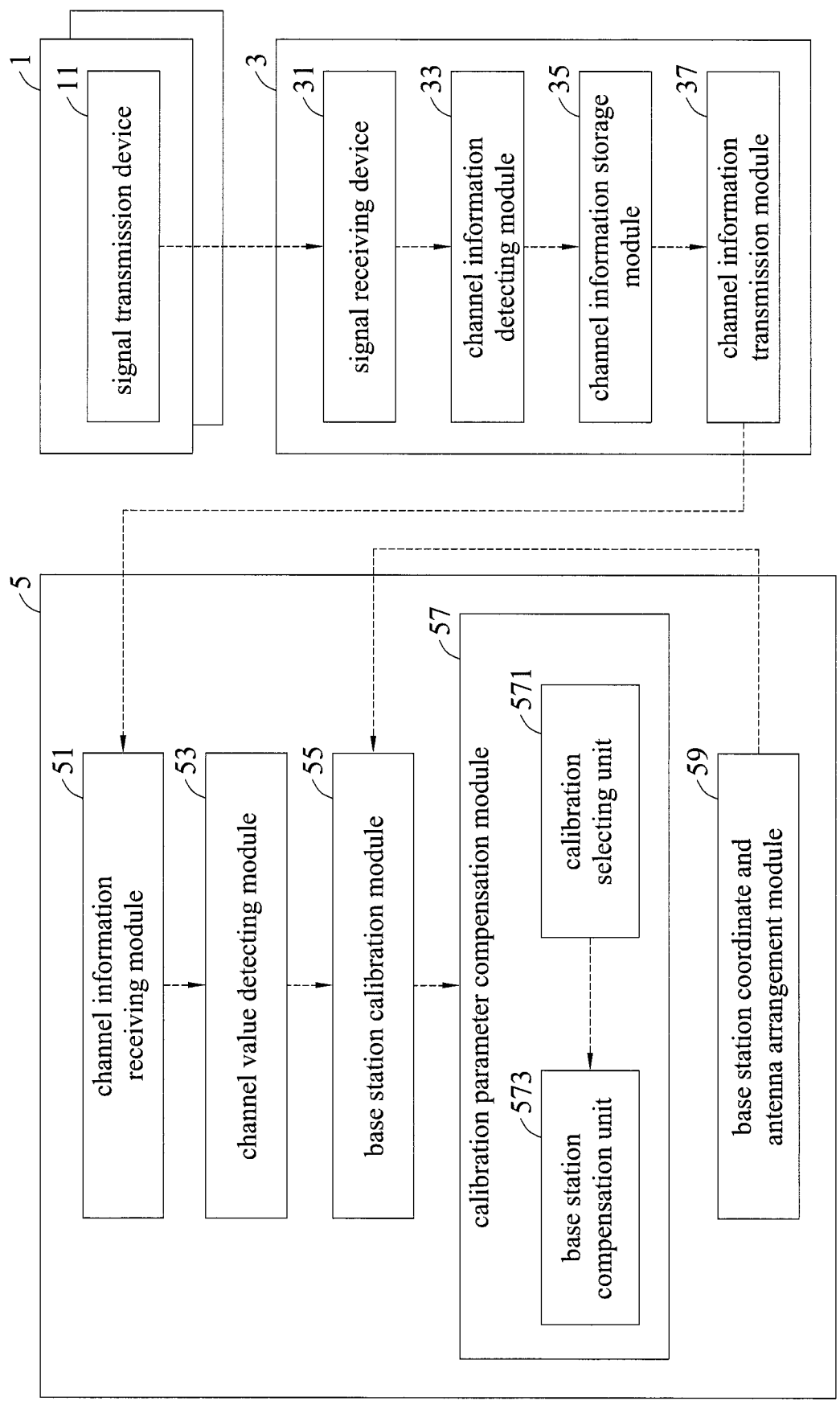
FIG. 6 is a block diagram depicting a positioning server (including a calibration selecting unit and a base station compensation unit of a calibration parameter compensation module) of a wireless positioning calibration system in accordance with the present disclosure.

FIG. 6 is a block diagram depicting a plurality of transmission base stations 1, at least one sniffer base station 3 and a positioning server 5 (including calibration parameter compensation module) in accordance with another embodiment of the present disclosure. The calibration parameter compensation module 57 of the positioning server 5 includes a calibration selecting unit 571 and a base station compensation unit 573. The calibration selecting unit 571 determines the incident directions of different signals based on the received signal strengths (RSS) of different antennas on the at least one sniffer base station 3. In other words, different calibration parameters can be calculated for different transmission base stations 1 based on the incident directions of different signals. Regarding the base station compensation unit 573 of the calibration parameter compensation module 57, the positioning server 5 performs compensations using the calculated phase errors $\omega_{i,k}$ and $\Delta_{i,k}$ and the antenna spacing error $\varepsilon$ by means of the plurality of CSI.

Another embodiment of the present disclosure is provided, which is similar to the embodiment above except that the positioning server 5 calculates an AoA error and a time of flight (ToF) error created by the at least one sniffer base station 3 by means of the plurality of CSI, and calibrates or compensates the AoA error and the ToF error.

Returning to FIG. 1, in accordance with this another embodiment of the present disclosure, the wireless positioning calibration system includes a plurality of transmission base stations 1, at least one sniffer base station 3, and a positioning server 5. The at least one sniffer base station 3 receives a plurality of CSI transmitted by the plurality of transmission base stations 1. The positioning server 5 receives the plurality of CSI transmitted from the at least one sniffer base station 3. This embodiment is different from the previous embodiment in that the positioning server 5 calculates an AoA error and a time of flight (ToF) error created by the at least one sniffer base station 3 by means of the plurality of CSI, and calibrates or compensates the AoA error and the ToF error.

As a result, referring back to FIG. 5, in accordance with this another embodiment of the present disclosure, the calibration value detecting unit 553 and the calibration parameter calculating unit 555 included in the base station calibration module 55 of the positioning server 5 are different from those in the previous embodiment.

In accordance with this another embodiment of the present disclosure, the calibration value detecting unit 553 in the base station calibration module 55 of the positioning server 5 detects the AoA error and the ToF error according to the following mathematical expressions (9) and (10), respectively:

$$\phi^R = \theta_k + \alpha \quad (9)$$

$$\tau^R = \tau_i + \beta \quad (10)$$

wherein $\theta_k$ is the measured AoA of the $k^{th}$ subcarrier of the at least one sniffer base station, $\theta^R$ is the actual AoA of the $k^{th}$ subcarrier of the at least one sniffer base station, $\tau_i$ is the measured ToF of the $i^{th}$ antenna of the at least one sniffer base station, $\tau^R$ is the actual ToF of the $i^{th}$ antenna of the at least one sniffer base station, $\alpha$ is the AoA error created by the at least one sniffer base station, and $\beta$ is the ToF error created by the at least one sniffer base station.

In accordance with this another embodiment of the present disclosure, the calibration parameter calculating unit 555 of the base station calibration module 55 in the positioning server 5 performs calculations according to the mathematical expressions (11) to (15) below:

$$\min \tau_{k \in \{1,2,\ldots,30\}} (\theta_k - \theta^R)^2 + \Sigma_{i \in \{1,2\}} (\tau_i - \tau^R)^2 \quad (11)$$

$$s.\ t.\ \theta_k = \theta^R + \alpha \quad (12)$$

$$\tau_i = \tau^R + \beta \quad (13)$$

$$-2\phi \leq \theta_k \leq 2\pi \quad (14)$$

$$0 \leq \tau_i \quad (15)$$

wherein $\theta_k$ is the measured AoA of the $k^{th}$ subcarrier of the at least one sniffer base station, $\theta^R$ is the actual AoA of the $k^{th}$ subcarrier of the at least one sniffer base station, $\tau_i$ is the measured ToF of the $i^{th}$ antenna of the at least one sniffer base station, $\tau^R$ is the actual ToF of the $i^{th}$ antenna of the at least one sniffer base station, $\alpha$ is the AoA error created by the at least one sniffer base station, and $\beta$ is the ToF error created by the at least one sniffer base station.

In addition to the wireless positioning calibration system provided by the present disclosure, a wireless positioning calibration method is also proposed.

Figure 7:
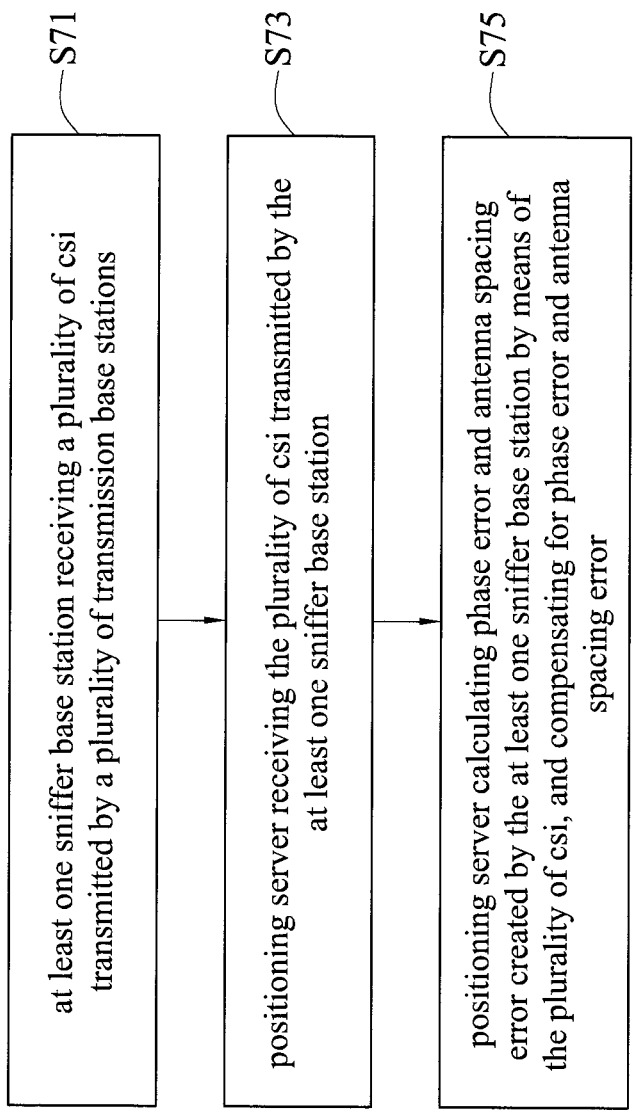
FIG. 7 is a flowchart illustrating a wireless positioning calibration method in accordance with an embodiment of the present disclosure.

As shown in FIG. 7, in accordance with an embodiment of the present disclosure, the wireless positioning calibration method includes steps S71, S73 and S75. In step S71, a plurality of CSI transmitted by a plurality of transmission base stations are received by at least one sniffer base station. In step S73, the plurality of CSI transmitted by the at least one sniffer base station are received by a positioning server. In step S75, a phase error and an antenna spacing error created by the at least one sniffer base station are calculated by the positioning server by means of the plurality of CSI, and the phase error and the antenna spacing error are calibrated or compensated.

Figure 8:
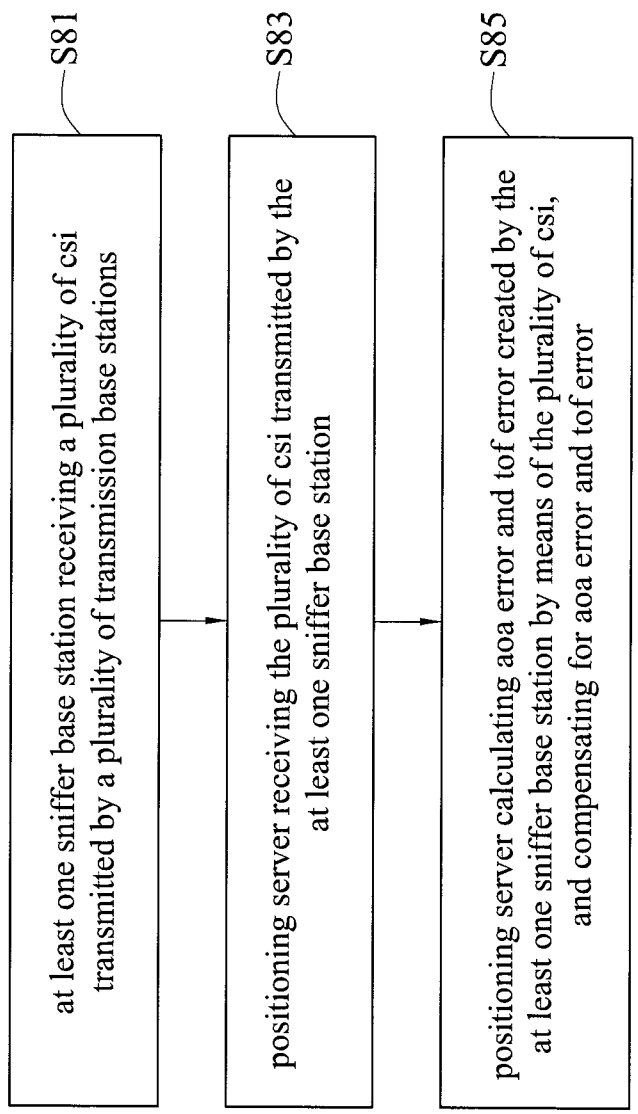
FIG. 8 is a flowchart illustrating a wireless positioning calibration method in accordance with another embodiment of the present disclosure.

As shown in FIG. 8, in accordance with another embodiment of the present disclosure, the wireless positioning calibration method includes steps S81, S83 and S85 below. In step S81, a plurality of CSI transmitted by a plurality of transmission base stations are received by at least one sniffer base station. In step S83, the plurality of CSI transmitted by the at least one sniffer base station are received by a positioning server. In step S85, an angle of arrival (AoA) error and a time of flight (ToF) error created by the at least one sniffer base station by means of the plurality of CSI are calculated by the positioning server, and the AoA error and the ToF error are calibrated or compensated.

Figure 9:
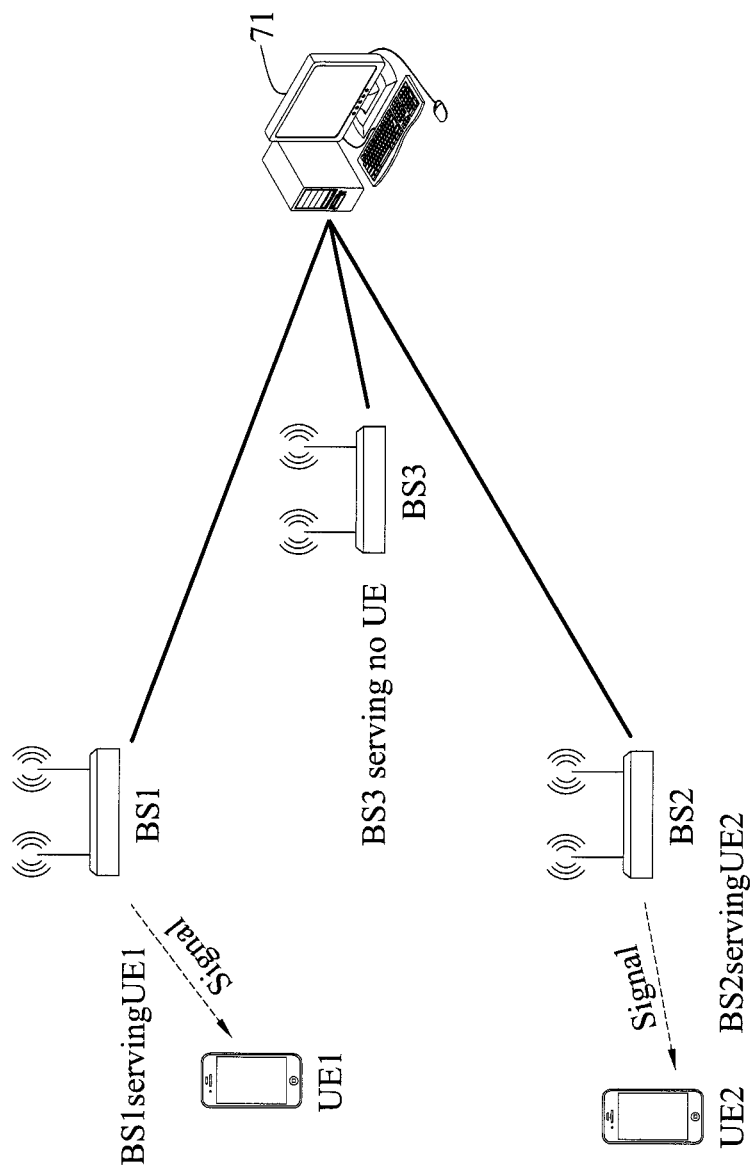
FIGS. 9-18 illustrate a wireless positioning calibration method in accordance with another embodiment of the present disclosure.

FIG. 9 shows an application example of a wireless positioning calibration method according to the present disclosure. It is assumed that there are three transmission base stations BS1, BS2 and BS3 and two user equipment UE1 and UE2 connected to the transmission base stations BS1 and BS2, respectively, so that the transmission base stations BS1 and BS2 serve the user equipment UE1 and UE2, respectively, and the transmission base station BS3 serves no user equipment. In an embodiment, a position server 71 is also included.

In an embodiment, the wireless positioning calibration method comprise steps S91-S95.

Figure 10:
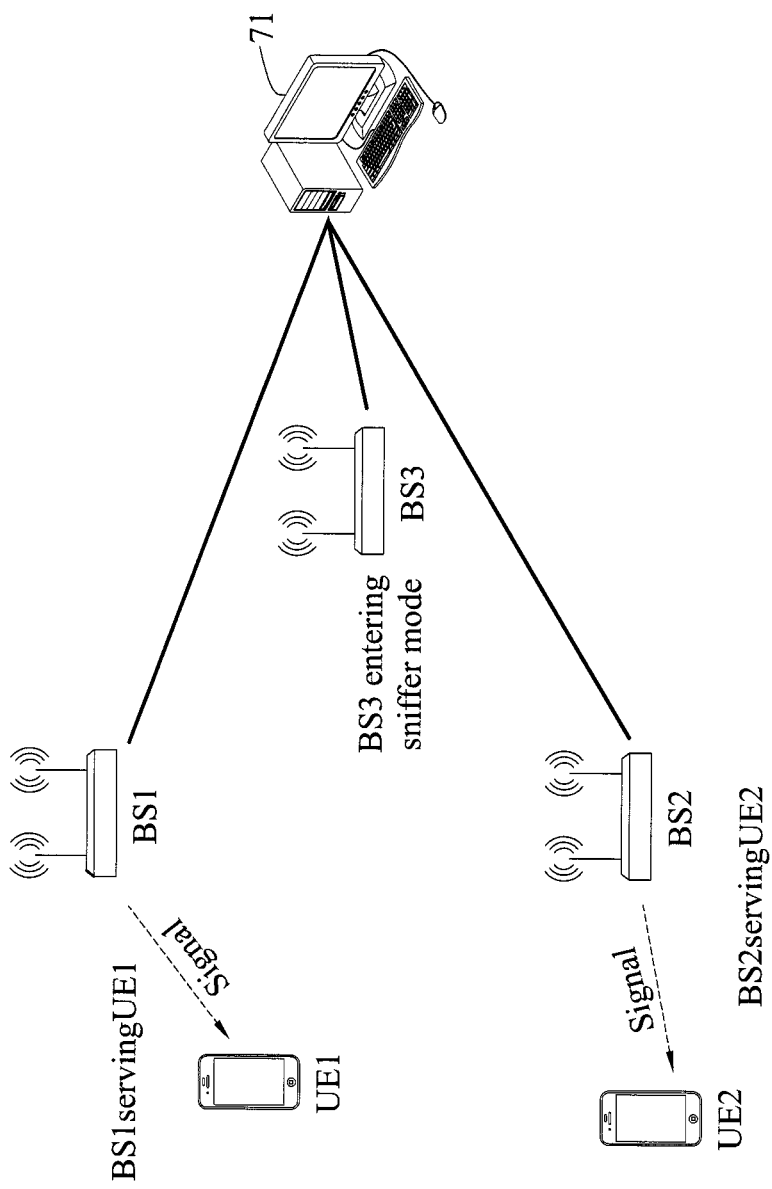

In step S91, as shown in FIG. 10, when the transmission base station BS3 does not serve any user equipment, the positioning server 71 assigns the transmission base station BS3 to enter the sniffer mode. Therefore, the transmission base station BS3 is a base station operating in the sniffer mode, and is called a monitoring base station.

Figure 11:
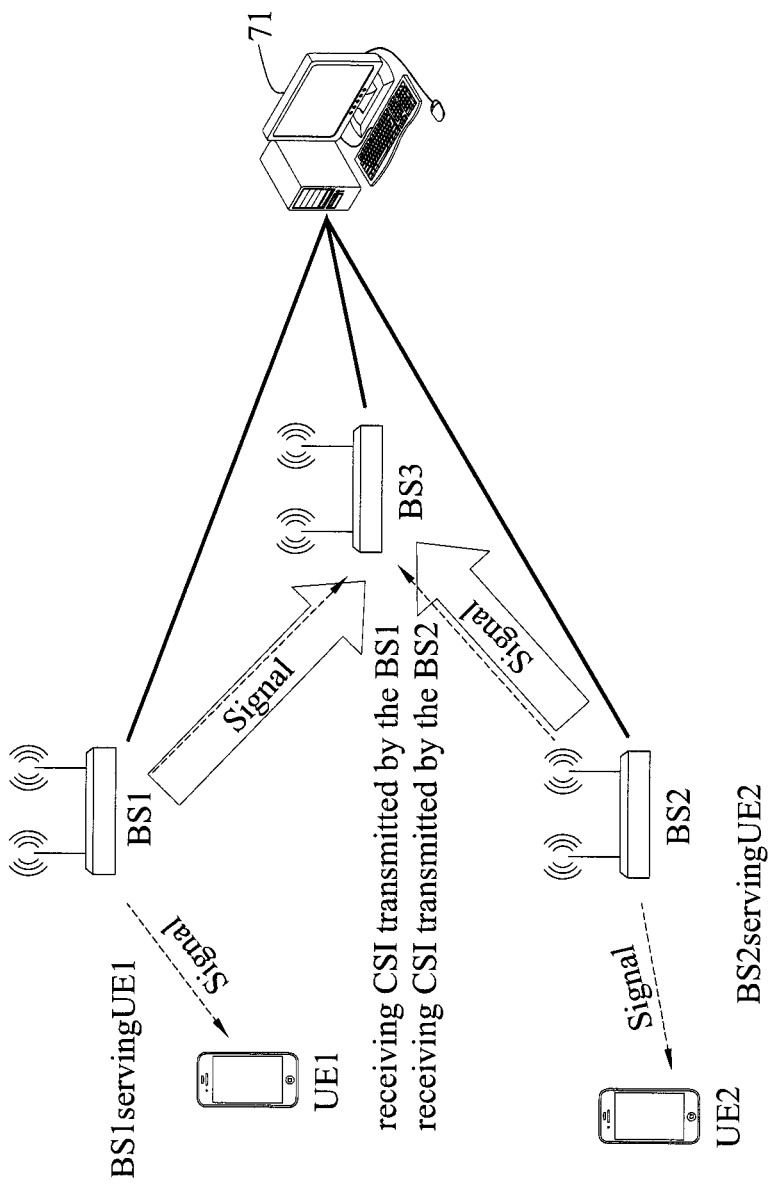

In step S92, as shown in FIG. 11, the transmission base station BS3 operating in the sniffer mode will receive the channel state information transmitted by the transmission base stations BS1 and BS2.

Figure 12:
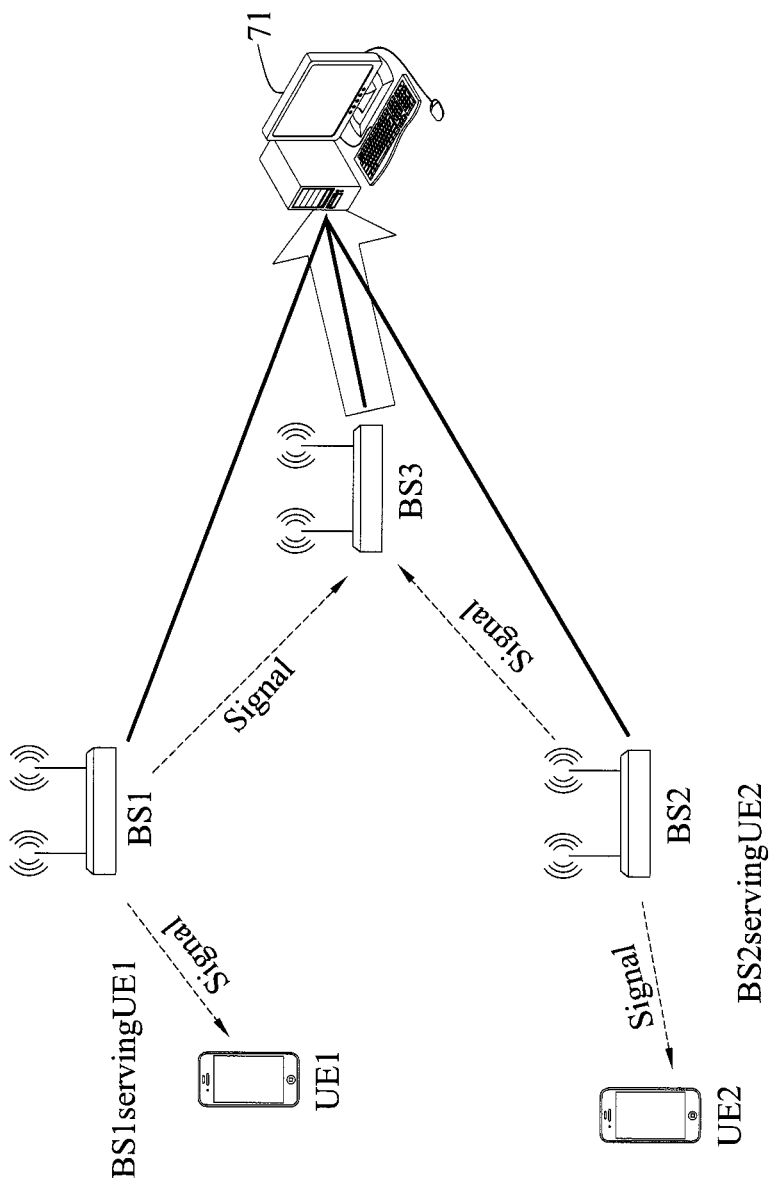

In step S93, as shown in FIG. 12, the transmission base station BS3 reports the channel state information transmitted by the transmission base stations BS1 and BS2 back to the positioning server 71.

Figure 13:
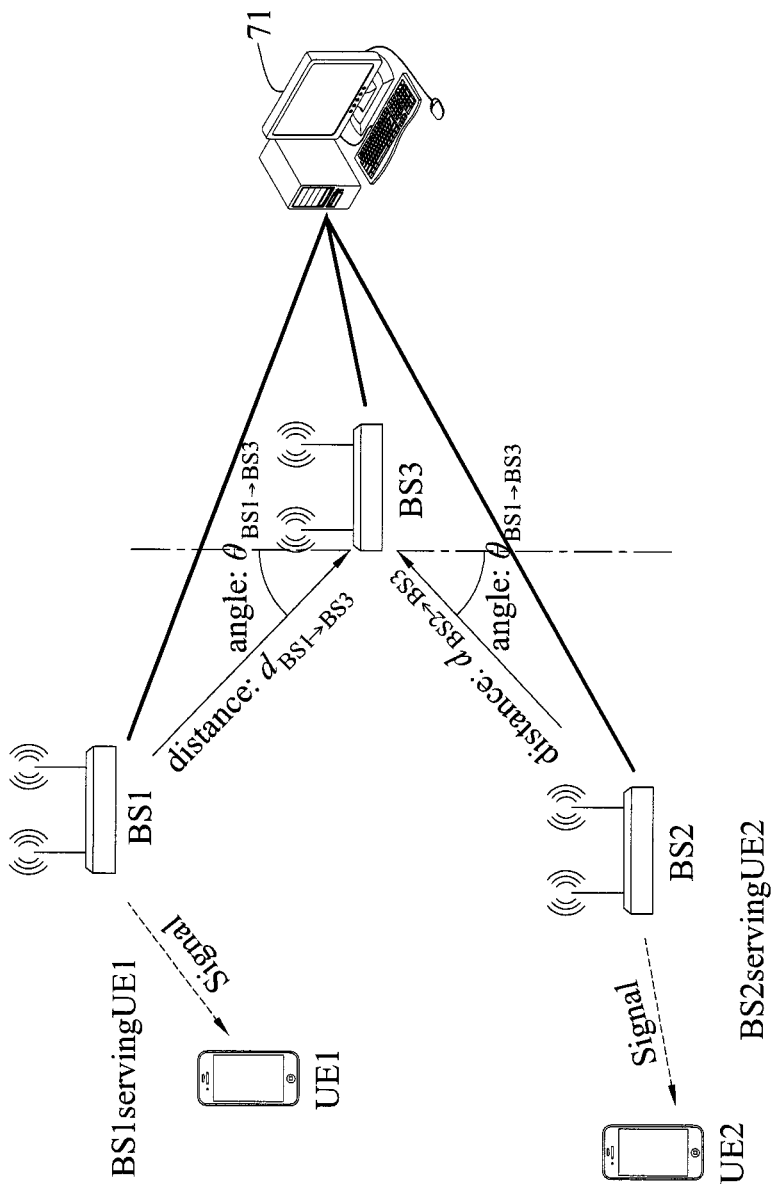

In step S94, as shown in FIG. 13, the positioning server 71 uses the known coordinates of the transmission base stations BS1 and BS2 to calibrate the transmission base station BS3. Signals from the transmission base station BS1 to the transmission base station BS3 have known incident angles incident angles $\theta_{BS1 \to BS3}$ and flying distances $d_{BS1 \to BS3}$, and signals from the transmission base station BS2 to the transmission base station BS3 also have known incident angles $\theta_{BS2 \to BS3}$ and flying distance $d_{BS2 \to BS3}$. The positioning server 71 uses $CSI_{BS1 \to BS3}$ and $CSI_{BS2 \to BS3}$ to compensate and calibrate a positioning error generated by an antenna hardware circuit and errors among antenna of the transmission base station BS3.

Figure 14:
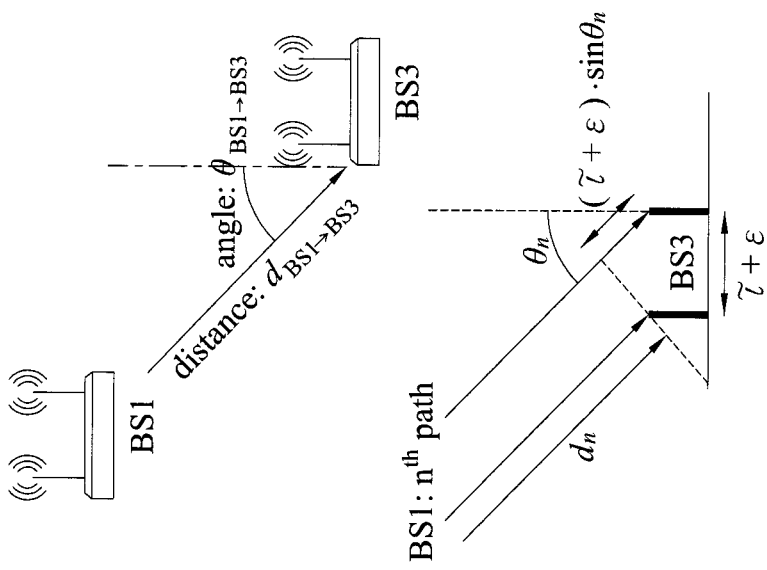

In step S94a, as shown in FIG. 14, it is assumed that i and k of the transmission base station BS3 are then antenna number and the sub-carrier number, respectively, and $i \in \{1, 2\}$ and $k \in \{1, 2, \ldots, 30\}$. The kth sub-carrier of the ith antenna of the transmission base station BS3 has a measured phase $\tilde{\theta}_{i,k}$ and an actual phase $\phi_{i,k}$ expressed by the following mathematical equation:

$$\phi_{i,k} = \tilde{\phi}_{i,k} - \omega_{i,k} 2\pi - \Delta_{i,k},$$

where $\omega_{ik}$ and $\Delta_{i,k}$ are phase errors of an actual signal and a measured signal, and $\phi_{i,k}$ rotates more than $\tilde{\phi}_{i,k}$ does by $\omega_{i,k}$ plus $\Delta_{i,k}$, wherein $0 < \Delta_{i,k} < 2\pi$, and $\omega_{i,k}$ and $\Delta_{i,k}$ are the phase errors generated by the antenna hardware circuit of the transmission base station BS3.

It is assumed that the transmission base station BS3 has an measured antenna interval $\tilde{l}$, and actual antenna interval $l$, and $l = \tilde{l} + \varepsilon$, wherein $\varepsilon$ is an error of an antenna interval. Signals are transmitted from the transmission base station BS1 to the transmission base station BS3 via N paths (n ∈ N), and are expressed by the following mathematical equation:

$$h_{i,k}^{Est} = \sum_{n=1}^{N} (a_e e^{-j2\pi \frac{d_n}{\lambda_k}}) e^{-j2\pi \frac{(i-1)(\tilde{l}+\varepsilon)\sin\theta_n}{\lambda_k}},$$

where $\alpha_n$ is the amplitude of the nth path, $d_n$ is the distance of the nth path, and $\theta_n$ is the angle of the nth path.

Next, an optimum set of $\omega_{i,k}$, $\Delta_{i,k}$ and $\varepsilon$ is found, such that the primary path (when n=M) will have the same actual and measured incident angles and flying distance. The mathematical equation is as follows:

$$\text{Min} \sum_{i \in \{1,2\}, k \in \{1,2,\ldots,30\}} \|h_{i,k} - h_{i,k}^{Est}\|^2$$

$$s.t.\ h_{i,k} = \tilde{a}_{i,k} e^{-j(\tilde{\phi}_{i,k} - \omega_{i,k} 2\pi - \Delta_{i,k})}$$

$$h_{i,k}^{Est} = \sum_{n=1}^{N} (a_n e^{-j2\pi \frac{d_n}{\lambda_k}}) e^{-j2\pi \frac{(i-1)(\tilde{l}+\varepsilon)\sin\theta_n}{\lambda_k}}$$

$$M = \operatorname{argmax}_{n \in N} \{a_n\}$$

-continued $$|\theta_M - \theta^R| \le B^A, |d_M - d^R| \le B^D$$

$$\omega_{i,k} \in \mathbb{Z}, 0 \le \Delta_{i,k} \le 2\pi,$$

where $B^A$ is the angle of the primary path, and $B^D$ is the distance of the primary path.

Figure 15:
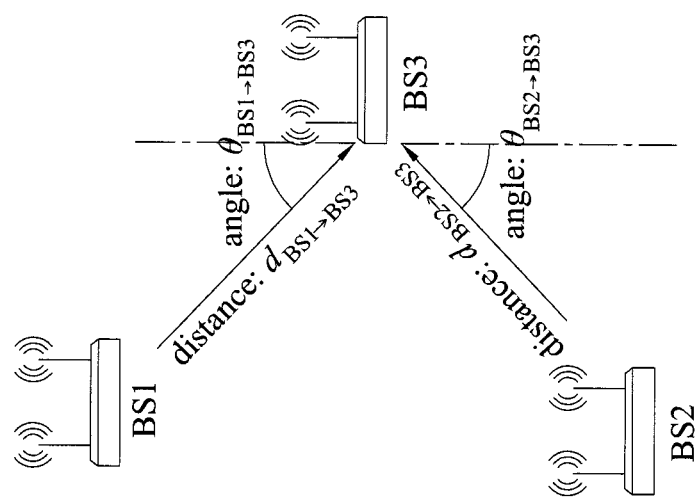

In step S94b, as shown in FIG. 15, calibration errors $\omega_{i,k}^{BS1 \to BS3}$, $\Delta_{i,k}^{BS1 \to BS3}$ and $\varepsilon_{i,k}^{BS1 \to BS3}$ of signals from the transmission base station BS1 to the transmission base station BS3 are solved based on the optimal set of $\omega_{i,k}$, $\Delta_{i,k}$ and $\varepsilon$. Similarly, calibration errors $\omega_{i,k}^{BS2 \to BS3}$, $\Delta_{i,k}^{BS2 \to BS3}$ and $\varepsilon_{i,k}^{BS2 \to BS3}$ of the signals from the transmission base station BS2 to the transmission base station BS3 can also be obtained based on the above steps.

Figure 16:
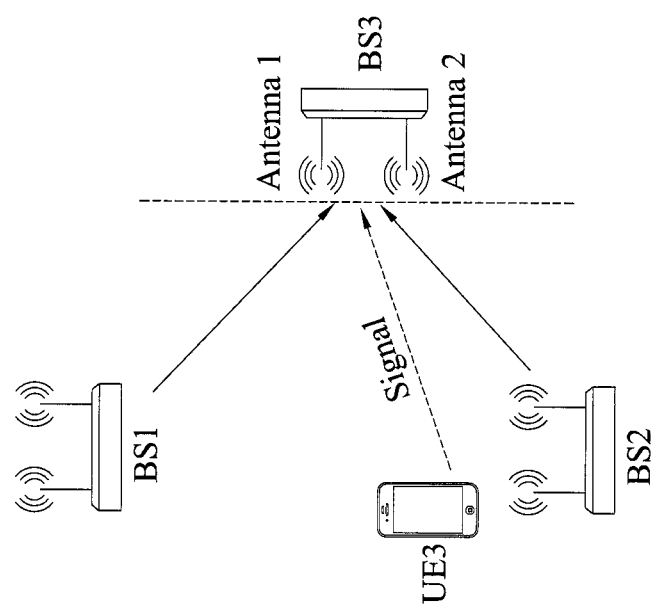
Figure 17:
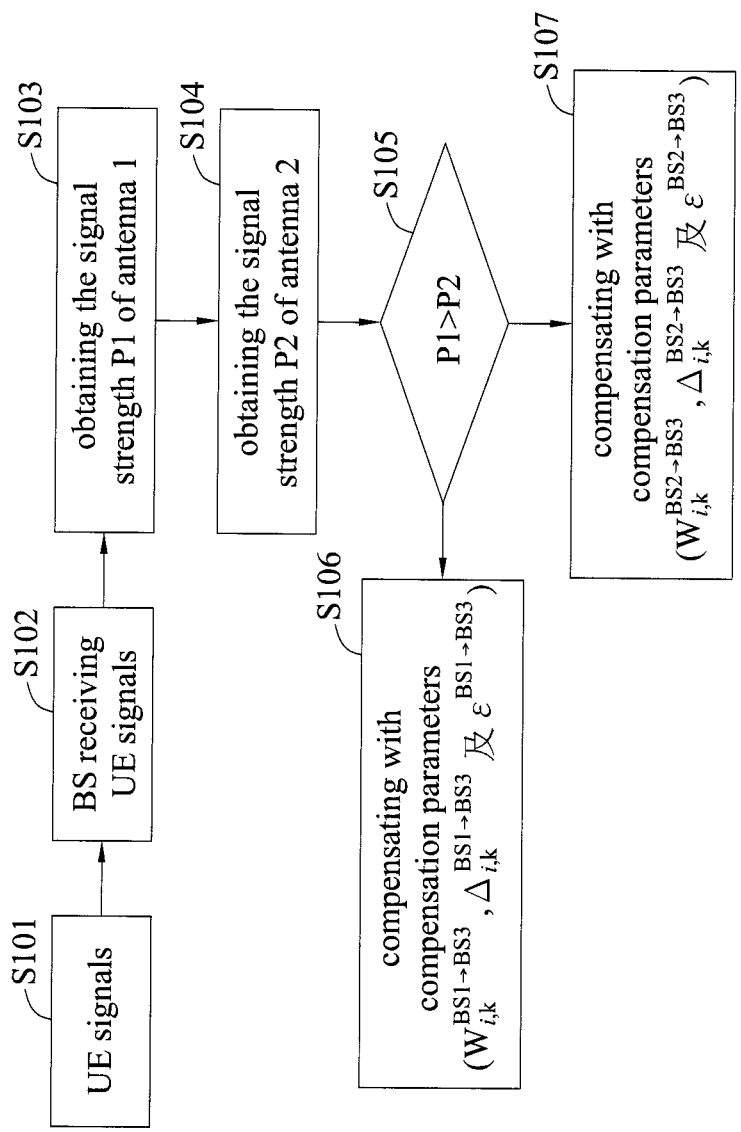

In step S94c, as shown in FIG. 16, the positioning server 71 can compensate the errors generated by the antenna hardware and the interval errors. The transmission base stations of different directions can calculate different calibration parameters. Therefore, an incident angle (e.g., −90 degrees to 0 degree or 0 degree to 90 degrees) of a signal can be determined based on the received strength signal of two antenna of the transmission base station BS3 operating in the sniffer mode. FIG. 17 shows the detailed flow chart of step S94c, including steps S101 to S107.

Figure 18:
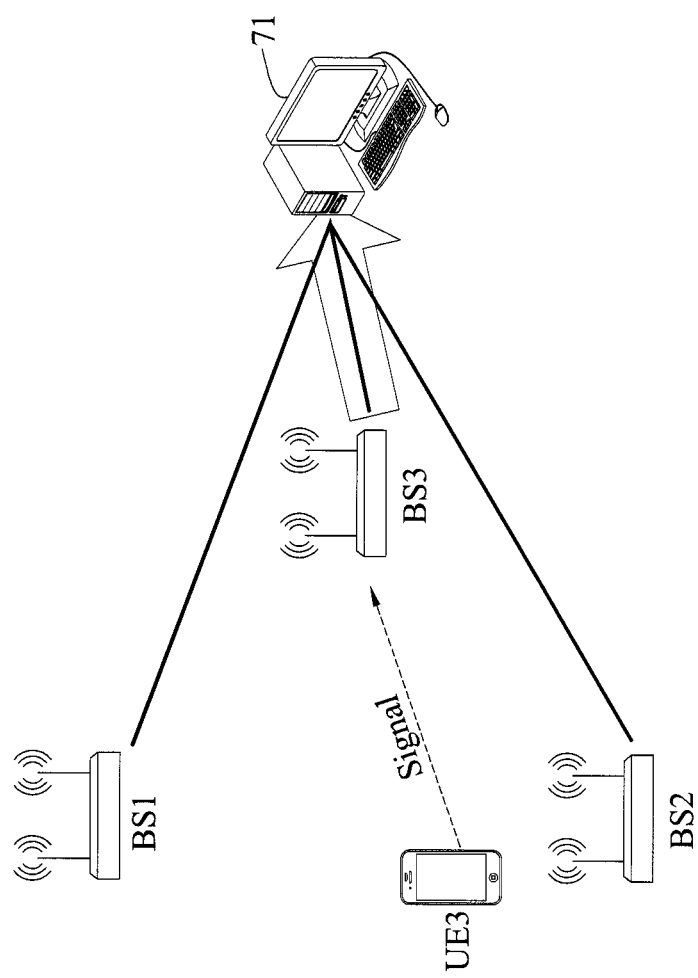

In step S95, as shown in FIG. 18, the transmission base station BS3, before positioning the user equipment UE3, will compensate the error of the user equipment UE3. In other words, the positioning server 71 receives the channel state information reported by the transmission base station BS3, and calibrates the phase error $\phi_{i,k} = \tilde{\phi}_{i,k} - \omega_{i,k}^{BS3} 2\pi - \Delta_i$, $k^{BS3}$ and the antenna interval error $l = \tilde{l} + \varepsilon^{BS3}$.

It can be appreciated that the embodiments above can be implemented using, for example, a genetic algorithm, a gradient search method or other kinds of algorithms, and the present disclosure is not limited as such.

In conclusion, positioning errors resulting from antenna hardware circuits and antenna spacing errors can be compensated by means of the at least one sniffer base station and self-calibration among base stations, thereby improving the accuracy in indoor positioning.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A wireless positioning calibration system, comprising:
   at least one sniffer base station configured for receiving a plurality of channel state information (CSI) transmitted by a plurality of base stations; and
   a positioning server configured for receiving the plurality of CSI transmitted by the at least one sniffer base station, calculating a phase error and an antenna spacing error created by the at least one sniffer base station by means of the plurality of CSI, and compensating the phase error and the antenna spacing error.

2. The wireless positioning calibration system of claim 1, wherein the at least one sniffer base station is a base station under a sniffer mode.

3. The wireless positioning calibration system of claim 1, wherein receiving signal strengths of different antennas on the at least one sniffer base station are used for determining incident directions of different signals.

4. The wireless positioning calibration system of claim 1, wherein each of the plurality of transmission base stations includes a signal transmission device configured for transmitting the plurality of CSI to the at least one sniffer base station.

5. The wireless positioning calibration system of claim 4, wherein the at least one sniffer base station includes a signal receiving device, a channel information detecting module, a channel information storage module, and a channel information transmission module, and the signal receiving device receives the CSI transmitted by the signal transmission devices and transmits the CSI to the positioning server.

6. The wireless positioning calibration system of claim 5, wherein the channel information detecting module includes a Media Access Control (MAC) address and cell ID detecting unit and a channel matrix detecting unit.

7. The wireless positioning calibration system of claim 1, wherein the positioning server includes a channel information receiving module, a channel value detecting module, a base station calibration module and a calibration parameter compensation module.

8. The wireless positioning calibration system of claim 7, wherein the channel information receiving module is used for receiving the CSI.

9. The wireless positioning calibration system of claim 7, wherein the channel value detecting module includes a base station detecting unit and a channel state detecting unit.

10. The wireless positioning calibration system of claim 7, wherein the base station calibration module includes a base station angle and distance calculating unit, a calibration value detecting unit, and a calibration parameter calculating unit, wherein the base station calibration module receives information transmitted from the channel value detecting module and a base station coordinate and antenna arrangement module to calculate angles and distances of the base stations.

11. The wireless positioning calibration system of claim 10, wherein the base station angle and distance calculating unit calculates an angle of arrival (AoA) of each of the plurality of CSI transmitted from each of the plurality of transmission base stations to the at least one sniffer base station and a distance between each of the plurality of transmission base stations and the at least one sniffer base station.

12. The wireless positioning calibration system of claim 10, wherein the calibration value detecting unit detects the phase error and the antenna spacing error according to two mathematical expressions below, respectively:

$$\phi_{i,k} = \tilde{\phi}_{i,k} - \omega_{i,k} 2\pi - \Delta_{i,k},$$

wherein i is an antenna number of the at least one sniffer base station, k is a subcarrier number of the at least one sniffer base station, $\phi_{i,k}$ is an actual phase of a $k^{th}$ subcarrier of an $i^{th}$ antenna of the at least one sniffer base station, $\tilde{\phi}_{i,k}$ is a measured phase of the $k^{th}$ subcarrier of the $i^{th}$ antenna of the at least one sniffer base station, and $\omega_{i,k}$ and $\Delta_{i,k}$ are phase errors created by the at least one sniffer base station;

$$l = \tilde{l} + \varepsilon,$$

wherein l is an actual antenna spacing of the at least one sniffer base station, $\tilde{l}$ is a measured antenna spacing of the at least one sniffer base station, and $\varepsilon$ is the antenna spacing error.

13. The wireless positioning calibration system of claim 10, wherein the calibration parameter calculating unit performs algorithms according to the mathematical expressions below:

$$\min \sum_{i \in \{1,2\}, k \in \{1,2,\ldots,30\}} \|h_{i,k} - h_{i,k}^{Est}\|^2,$$

$$\text{s.t. } h_{i,k} = \tilde{a}_{i,k} e^{-j(\tilde{\phi}_{i,k} - \omega_{i,k} 2\pi - \Delta_{i,k})},$$

$$h_{i,k}^{Est} = \sum_{n=1}^{N} \left(a_n e^{-j2\pi \frac{d_n}{\lambda_k}}\right) e^{-j2\pi \frac{(i-1)(\tilde{l}+\varepsilon)\sin\theta_n}{\lambda_k}},$$

$$M = \operatorname{argmax}_{n \in N} \{a_n\},$$

$$|\theta_M - \theta^R| \le B^A, |d_M - d^R| \le B^D, \text{ and}$$

$$\omega_{i,k} \in \mathbb{Z}, 0 \le \Delta_{i,k} \le 2\pi,$$

wherein $\tilde{\alpha}_{i,k}$ is a measured channel amplitude of $k^{th}$ subcarrier of an $i^{th}$ antenna of the at least one sniffer base station, $\phi_{i,k}$ is an actual phase of the $k^{th}$ subcarrier of the $i^{th}$ antenna of the at least one sniffer base station, $\tilde{\phi}_{i,k}$ is a measured phase of the $k^{th}$ subcarrier of the $i^{th}$ antenna of the at least one sniffer base station, $\omega_{i,k}$ and $\Delta_{i,k}$ are phase errors created by the at least one sniffer base station, $\lambda_k$ is a signal wavelength, M is a primary path (when n=M); $\theta_M$ is an angle of the primary path, $d_M$ is a distance of the primary path, $\theta^R$ is an actual angle of arrival, $d^R$ is an actual distance, $\alpha_n$ is an amplitude of an $n^{th}$ path, $d_n$ is a distance of the $n^{th}$ path, $\theta_n$ is an angle of the $n^{th}$ path, l is an actual antenna spacing of the at least one sniffer base station, $\tilde{l}$ is a measured antenna spacing of the at least one sniffer base station, ε is an error of antenna spacing, $B^A$ is an angle of the primary path, and $B^D$ is a distance of the primary path.

14. The wireless positioning calibration system of claim 7, wherein the calibration parameter compensation module includes a calibration selecting unit and a base station compensation unit.

15. A wireless positioning calibration system, comprising:
at least one sniffer base station configured for receiving a plurality of channel state information (CSI) transmitted by a plurality of transmission base stations; and
a positioning server configured for receiving the plurality of CSI transmitted by the at least one sniffer base station, calculating an angle of arrival (AoA) error and a time of flight (ToF) error created by the at least one sniffer base station by means of the plurality of CSI, and compensating the AoA error and the ToF error.

16. The wireless positioning calibration system of claim 15, wherein the at least one sniffer base station is a base station under a sniffer mode.

17. The wireless positioning calibration system of claim 15, wherein receiving signal strengths of different antennas on the at least one sniffer base station are used for determining incident directions of different signals.

18. The wireless positioning calibration system of claim 15, wherein each of the plurality of transmission base stations includes a signal transmission device configured for transmitting the plurality of CSI to the at least one sniffer base station.

19. The wireless positioning calibration system of claim 18, wherein the at least one sniffer base station includes a signal receiving device, a channel information detecting module, a channel information storage module, and a channel information transmission module, wherein the signal receiving device receives the CSI transmitted by the signal transmission devices and transmits the CSI to the positioning server.

20. The wireless positioning calibration system of claim 19, wherein the channel information detecting module includes a Media Access Control (MAC) address and cell ID detecting unit and a channel matrix detecting unit.

21. The wireless positioning calibration system of claim 15, wherein the positioning server includes a channel information receiving module, a channel value detecting module, a base station calibration module and a calibration parameter compensation module.

22. The wireless positioning calibration system of claim 21, wherein the channel information receiving module is used for receiving the CSI.

23. The wireless positioning calibration system of claim 21, wherein the channel value detecting module includes a base station detecting unit and a channel state detecting unit.

24. The wireless positioning calibration system of claim 21, wherein the base station calibration module includes a base station angle and distance calculating unit, a calibration value detecting unit, and a calibration parameter calculating unit, and the base station calibration module receives information transmitted from the channel value detecting module and a base station coordinate and antenna arrangement module to calculate angles and distances of the base stations.

25. The wireless positioning calibration system of claim 24, wherein the base station angle and distance calculating unit calculates an angle of arrival (AoA) of each of the plurality of CSI transmitted from each of the plurality of transmission base stations to the at least one sniffer base station and a distance between each of the plurality of transmission base stations and the at least one sniffer base station.

26. The wireless positioning calibration system of claim 24, wherein the calibration value detecting unit detects the AoA error and the ToF error according to the following two mathematical expressions, respectively:

$$\theta^R = \theta_k + \alpha, \text{ and}$$

$$\tau^R = \tau_i + \beta,$$

wherein $\theta_k$ is a measured AoA of a $k^{th}$ subcarrier of the at least one sniffer base station, $\theta^R$ is an actual AoA of the $k^{th}$ subcarrier of the at least one sniffer base station, $\tau_i$ is a measured ToF of an $i^{th}$ antenna of the at least one sniffer base station, $\tau^R$ is an actual ToF of the $i^{th}$ antenna of the at least one sniffer base station, α is an AoA error created by the at least one sniffer base station, and β is a ToF error created by the at least one sniffer base station.

27. The wireless positioning calibration system of claim 24, wherein the calibration parameter calculating unit performs calculations according to the mathematical expressions below:

$$\min \tau_{k \in \{1,2,\ldots,30\}} (\theta_k - \theta^R)^2 + \Sigma_{i \in \{1,2\}} (\tau_i - \tau^R)^2,$$

$$s. t. \theta_k = \theta^R + \alpha,$$

$$\tau_i = \tau^R + \beta,$$

$$-2\pi \le \theta_k \le 2\pi,$$

$$0 \le \tau_i,$$

wherein $\theta_k$ is a measured AoA of a $k^{th}$ subcarrier of the at least one sniffer base station, $\theta^R$ is an actual AoA of the $k^{th}$ subcarrier of the at least one sniffer base station, $\tau_i$ is a measured ToF of an $i^{th}$ antenna of the at least one sniffer base station, $\tau^R$ is an actual ToF of the $i^{th}$ antenna of the at least one sniffer base station, α is an AoA error created by the at least one sniffer base station, and β is a ToF error created by the at least one sniffer base station.

28. The wireless positioning calibration system of claim 21, wherein the calibration parameter compensation module includes a calibration selecting unit and a base station compensation unit.

29. A wireless positioning calibration method, comprising:
at least one sniffer base station receiving a plurality of CSI transmitted by a plurality of transmission base stations;
a positioning server receiving the plurality of CSI transmitted by the at least one sniffer base station; and
the positioning server calculating a phase error and an antenna spacing error created by the at least one sniffer base station by means of the plurality of CSI, and compensating the phase error and the antenna spacing error.

30. The wireless positioning calibration method of claim 29, further comprising configuring the at least one sniffer base station in a sniffer mode.

31. The wireless positioning calibration method of claim 29, further comprising determining incident directions of different signals based on receiving signal strengths of different antennas of the at least one sniffer base station.

32. The wireless positioning calibration method of claim 29, further comprising the positioning server detecting the phase error and the antenna spacing error according to two mathematical expressions below, respectively:

$$\phi_{i,k} = \tilde{\phi}_{i,k} - \omega_{i,k} 2\pi - \Delta_{i,k},$$

wherein l is an antenna number of the at least one sniffer base station, k is a subcarrier number of the at least one sniffer base station, $\phi_{i,k}$ is an actual phase of a $k^{th}$ subcarrier of an $i^{th}$ antenna of the at least one sniffer base station, $\tilde{\phi}_{i,k}$ is a measured phase of the $k^{th}$ subcarrier of the $i^{th}$ antenna of the at least one sniffer base station, and $\omega_{i,k}$ and $\Delta_{i,k}$ are phase errors created by the at least one sniffer base station;

$$l = \tilde{l} + \varepsilon,$$

wherein l is an actual antenna spacing of the at least one sniffer base station, $\tilde{l}$ is a measured antenna spacing of the at least one sniffer base station, and $\varepsilon$ is the antenna spacing error.

33. The wireless positioning calibration method of claim 29, wherein the calibration parameter compensation for the phase error and the antenna spacing error are carried out according to the mathematical expressions below:

$$\min \sum_{i \in \{1,2\}, k \in \{1,2,\ldots,30\}} \|h_{i,k} - h_{i,k}^{Est}\|^2,$$

$$s.t. \ h_{i,k} = \tilde{a}_{i,k} e^{-j(\tilde{\phi}_{i,k} - \omega_{i,k} 2\pi - \Delta_{i,k})},$$

$$h_{i,k}^{Est} = \sum_{n=1}^{N} \left(a_n e^{-j2\pi \frac{d_n}{\lambda_k}}\right) e^{-j2\pi \frac{(i-1)(\tilde{l}+\varepsilon)\sin\theta_n}{\lambda_k}},$$

$$M = \operatorname{argmax}_{n \in N} \{a_n\},$$

$$|\theta_M - \theta^R| \le B^A, |d_M - d^R| \le B^D,$$

$$\omega_{i,k} \in \mathbb{Z}, 0 \le \Delta_{i,k} \le 2\pi,,$$

wherein $\tilde{\alpha}_{i,k}$ is a measured channel amplitude of a $k^{th}$ subcarrier of an $i^{th}$ antenna of the at least one sniffer base station, $\phi_{i,k}$ is an actual phase of the $k^{th}$ subcarrier of the $i^{th}$ antenna of the at least one sniffer base station, $\tilde{\phi}_{i,k}$ is a measured phase of the $k^{th}$ subcarrier of the $i^{th}$ antenna of the at least one sniffer base station, $\omega_{i,k}$ and $\Delta_{i,k}$ are phase errors created by the at least one sniffer base station, $\lambda_k$ is a signal wavelength, M is a primary path (when n=M), $\theta_M$ is an angle of the primary path, $d_M$ is a distance of the primary path, $\theta^R$ is an actual angle of arrival, $d^R$ is an actual distance, $\alpha_n$ is an amplitude of an $n^{th}$ path, $d_n$ is a distance of the $n^{th}$ path, $\theta_n$ is an angle of the $n^{th}$ path, l is an actual antenna spacing of the at least one sniffer base station, $\tilde{l}$ is a measured antenna spacing of the at least one sniffer base station, $\varepsilon$ is an error in antenna spacing, $B^A$ is an angle of the primary path, and $B^D$ is a distance of the primary path.

34. A wireless positioning calibration method, comprising:
at least one sniffer base station receiving a plurality of CSI transmitted by a plurality of transmission base stations;
a positioning server receiving the plurality of CSI transmitted by the at least one sniffer base station; and
the positioning server calculating an angle of arrival (AoA) error and a time of flight (ToF) error created by the at least one sniffer base station by means of the plurality of CSI, and compensating the AoA error and the ToF error.

35. The wireless positioning calibration method of claim 34, further comprising configuring the at least one sniffer base station in a sniffer mode.

36. The wireless positioning calibration method of claim 34, further comprising determining incident directions of different signals based on receiving signal strengths of different antennas of the at least one sniffer base station.

37. The wireless positioning calibration method of claim 34, further comprising the positioning server detecting the AoA error and the ToF error according to two mathematical expressions below, respectively:

$$\theta^R = \theta_k + \alpha, \text{ and}$$

$$\tau^R = \tau_i + \beta,$$

wherein $\theta_k$ is a measured AoA of a $k^{th}$ subcarrier of the at least one sniffer base station, $\theta^R$ is an actual AoA of the $k^{th}$ subcarrier of the at least one sniffer base station, $\tau_i$ is a measured ToF of an $i^{th}$ antenna of the at least one sniffer base station, $\tau^R$ is an actual ToF of the $i^{th}$ antenna of the at least one sniffer base station, $\alpha$ is the AoA error created by the at least one sniffer base station, and $\beta$ is the ToF error created by the at least one sniffer base station.

38. The wireless positioning calibration method of claim 34, wherein the calibration parameter compensation for the AoA error and the ToF error are carried out according to the mathematical expressions below:

$$\min \tau_{k \in \{1,2,\ldots,30\}} (\theta_k - \theta^R)^2 + \Sigma_{i \in \{1,2\}} (\tau_i - \tau^R)^2,$$

$$s.\ t.\ \theta_k = \theta^R + \alpha,$$

$$\tau_i = \tau^R + \beta$$

$$-2\pi \le \theta_k \le 2\pi, \text{ and}$$

$$0 \le \tau_i,$$

wherein $\theta_k$ is a measured AoA of a $k^{th}$ subcarrier of the at least one sniffer base station, $\theta^R$ is an actual AoA of the $k^{th}$ subcarrier of the at least one sniffer base station, $\tau_i$ is a measured ToF of an $i^{th}$ antenna of the at least one sniffer base station, $\tau^R$ is an actual ToF of the $i^{th}$ antenna of the at least one sniffer base station, $\alpha$ is the AoA error created by the at least one sniffer base station, and $\beta$ is the ToF error created by the at least one sniffer base station.

* * * * *